(12) United States Patent
Rosak et al.

(10) Patent No.: US 9,234,799 B2
(45) Date of Patent: Jan. 12, 2016

(54) METHOD AND DEVICE FOR INTERFEROMETRIC INVERSION WITH FREE SAMPLING

(75) Inventors: Alain Rosak, Toulouse (FR); Clémence Pierangelo, Toulouse (FR)

(73) Assignee: CENTRE NATIONAL D'ETUDES SPATIALES (FR)

( * ) Notice: Subject to any disclaimer, the term of this patent is extended or adjusted under 35 U.S.C. 154(b) by 659 days.

(21) Appl. No.: 12/743,693

(22) PCT Filed: Nov. 5, 2008

(86) PCT No.: PCT/EP2008/064975
§ 371 (c)(1),
(2), (4) Date: May 19, 2010

(87) PCT Pub. No.: WO2009/065736
PCT Pub. Date: May 28, 2009

(65) Prior Publication Data
US 2010/0256938 A1 Oct. 7, 2010

(30) Foreign Application Priority Data
Nov. 19, 2007 (FR) ..................................... 07 59135

(51) Int. Cl.
*G01R 23/16* (2006.01)
*G01B 9/02* (2006.01)
*G01J 3/45* (2006.01)

(52) U.S. Cl.
CPC .......................................... *G01J 3/45* (2013.01)

(58) Field of Classification Search
CPC ........................................................ G01J 3/45
USPC ............ 702/76, 28, 27, 75, 77; 600/310, 309; 356/450, 451, 496, 497, 498
See application file for complete search history.

(56) References Cited

U.S. PATENT DOCUMENTS 6,061,582 A     5/2000  Small et al.
7,092,101 B2 *  8/2006  Brady et al. ............... 356/456
(Continued)

FOREIGN PATENT DOCUMENTS

FR    2 787 186 A1    6/2000
WO    96/29582 A1     9/1996
WO    2007/057016 A1  5/2007

OTHER PUBLICATIONS

Pandit S M et al: "Data-Dependent-Systems and Fourier-Transform Methods for Single-Interferogram Analysis" Applied Optics, OSA, Optical Society of America, Washington, DC, vol. 34, No. 26, (Sep. 10, 1995), pp. 5945-5951, XP000523021.

(Continued)

*Primary Examiner* — Sujoy Kundu
*Assistant Examiner* — Ricky Ngon
(74) *Attorney, Agent, or Firm* — Lerner, David, Littenberg, Krumholz & Mentlik, LLP (57) ABSTRACT

The invention relates according to a first aspect to an interferometric inversion method for measuring a characteristic variable of a radiation source and/or of a medium through which the radiation passes between the source and an interferometer, the interferometer being capable of generating an interferogram of the radiation by creating a finite number of optical step differences between two rays that have followed the same path between the source and the interferometer, characterized by the implementation of the steps whereby a quantity characterizing an improvement in the inversion is determined, step differences that contribute mainly to optimizing the quantity characterizing an improvement in the inversion are selected without sampling regularity constraints, and a free interferogram is generated using only the selected step differences. According to a second aspect, the invention provides an interferometer for implementing the method according to the first aspect of the invention.

6 Claims, 3 Drawing Sheets

(56) References Cited

U.S. PATENT DOCUMENTS

| | | | |
|---|---|---|---|
| 7,408,649 B2* | 8/2008 | Freischlad et al. | 356/497 |
| 7,616,323 B2* | 11/2009 | De Lega et al. | 356/511 |
| 2007/0046953 A1* | 3/2007 | De Groot et al. | 356/512 |

OTHER PUBLICATIONS

Search Report from corresponding French Application No. 0759135 dated May 16, 2008.
International Search Report, PCT/EP2008/064975, dated Feb. 3, 2009.

* cited by examiner

FIG.1

FIG_2

FIG_3

FIG_4

FIG_5

METHOD AND DEVICE FOR INTERFEROMETRIC INVERSION WITH FREE SAMPLING

CROSS-REFERENCE TO RELATED APPLICATIONS

The present application is a national phase entry under 35 U.S.C. §371 of International Application No. PCT/EP2008/064975, filed Nov. 5, 2008, published in French, which claims the benefit of French Patent Application No. 0759135, filed Nov. 19, 2007. The disclosures of said applications are incorporated by reference herein.

The field of the invention is that of interferometry for characterizing a source of radiation and/or a medium crossed by radiation between the source and an interferometer.

The invention more specifically relates to an interferometric inversion method for characterizing a radiation source and/or a medium crossed by the radiation between the source and an interferometer, applying interferometric inversion by directly utilizing the information contained in the interferogram elaborated by the interferometer.

Figure 1:
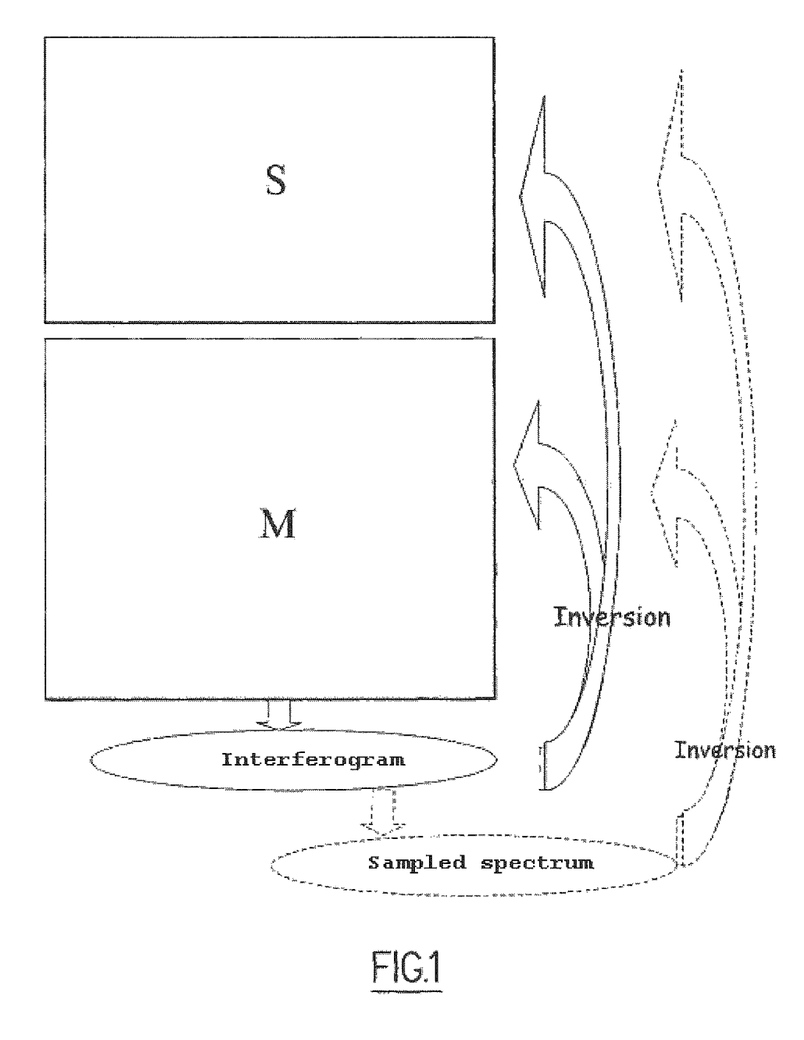
FIG. 1 illustrates a conventional technique for characterizing a radiation source and/or medium crossed by radiation from the radiation source.

A radiation source S and a medium M crossed by the radiation from the source S are illustrated in FIG. 1.

The source S may be a natural source (for example a terrestrial surface, the sun, etc., or an artificial source (for example a lamp, a laser, etc.), the properties of which are for example the temperature, the emissivity/reflectance (related to the chemical, mineralogical composition, to the humidity levels, etc.).

The medium M may be the Earth's atmosphere or a planetary atmosphere, a gas or liquid cell, a preparation containing a molecule of chemical or biological interest, etc., the properties of which are for example the temperature, the chemical composition and the concentration of the different elements, the presence of solid or liquid particles in a gas, etc.

Generally, it is sought to characterize the source S and/or the medium M by again finding one or more properties of the source S and/or of the medium M from an interferogram elaborated by an interferometer collecting the radiation emitted by the source S, after crossing the medium M. These found properties may be qualitative (presence of a given molecule) or quantitative (measurement of the concentration of a gas, or of an atmospheric temperature profile).

A known technique consists of bringing the radiation stemming from the source S and having crossed the medium M to the input of an interferometer (not shown) capable of elaborating an interferogram of the radiation by creating a finite number of optical path differences between two rays which have followed the same path between the source and the interferometer.

The interferogram thus represents the optical Fourier transform of the luminance spectrum at the input of the interferometer.

The conventional technique for using a Fourier transform spectrometer goes through the reconstruction of a sample spectrum from the interferogram in order to then invert the interesting properties with which the radiation source and/or the medium crossed by the radiation, may be characterized.

Reconstruction of the spectrum requires the calculation of an inverse Fourier transform. Passing from the interferogram to the spectrum then requires relatively regular sampling of the interferogram so as to meet the Shannon or Nyquist condition. This means that the maximum distance between two samples should not exceed $1/(2\Delta\sigma)$, with $\Delta\sigma$ being the width of the observed spectral band, whence a minimum number of points in the interferogram of $2\Delta\sigma D$ for a maximum path difference of D. This criterion for sampling the interferogram is a heavy constraint at the instrument, notably for producing a conventional Fourier transform spectrometer. Indeed, in order to attain high spectral resolution (for example for detecting a fine line in the spectrum), a large value of D is required and therefore the interferogram should contain a great number of samples.

Techniques exist which allow reconstruction of a spectrum from an irregularly sampled interferogram. These techniques however have the following limitations:
   they may involve constraints on the sampling of the interferogram, which, although irregular, is not totally free;
   they may only allow reconstruction of a portion of the spectrum (a few emission lines, generally) and they are then not applicable to absorption spectra.

The conventional technique applying reconstruction of the spectrum from the interferogram, and inversion of the spectrum for characterizing the source S and/or the medium M, is illustrated by the elements in dotted lines in FIG. 1.

The invention comes within the scope of techniques which as for them apply interferometric inversion directly utilizing the information contained in the interferogram, this without any spectrum reconstruction. These techniques give the possibility of <<shortening>> the characterization loop by suppressing the steps in dotted lines in FIG. 1.

Indeed, the same inversion algorithms as those used for passing from the spectrum to the properties of the crossed medium and/or of the source, may be used for achieving interferometric inversion directly utilizing the information contained in the interferogram. For example, algorithms such as optimum estimation or proximity recognition are suitable. In this respect it has been shown that the inversion on a given spectrum or on a sampled interferogram so as to obtain the given spectrum leads to the same final performances in terms of number of found pieces of information and of their associated accuracies.

It is thus understood within the scope of the invention that it is sought to directly utilize the information contained in an interferogram in order to gain knowledge on the characteristics of the radiation source and/or of the medium crossed by the radiation between the source and the interferometer, and this without any spectrum reconstruction. With this, characteristics may be obtained such as the chemical composition, the concentration of a given molecular species, the temperature, the emissivity, etc., of the source and/or of the crossed medium, without carrying out the Fourier transform of the interferogram (i.e. without acquiring any spectrum) and therefore without any constraint on sampling the interferogram.

Direct utilization of the interferogram was for example already proposed:
   for atmospheric sounding, for example in:
      Kyle, <<Temperature soundings with partially scanned interferograms>>, 1977
      Spankuch et al., <<Investigations on temperature soundings using partial interferograms>>, 1987
   or further for identifying compounds in chemistry, for example in:
      De Haseth et al., <<Interferogram-based infrared search system>>, 1981.

However, the investigations presented in these articles all utilize an interferogram, possibly a partial interferogram, consisting of a single regularly sampled segment. With these investigations, it is therefore not possible to lift constraints in the regularity of the sampling of the interferogram.

Starting from this acknowledgment, the object of the invention is to propose a technique with which it is possible to get rid of the sampling constraints so as to notably allow inversion from an irregularly sampled or sub-sampled interferogram which does not observe the Shannon or Nyquist condition.

For this purpose, the invention according to a first aspect, proposes an interferometric inversion method for measuring a variable characteristic of a radiation source and/or of a medium crossed by the radiation between the source and an interferometer, the interferometer being capable of elaborating an interferogram of the radiation by creating a finite number of optical path differences between two rays having followed the same path between the source and the interferometer, characterized by the application of steps according to which:
 a quantity characterizing an improvement of the inversion is determined,
 path differences which mainly contribute to optimizing the quantity characterizing an improvement in the inversion are selected without any sampling regularity constraints,
 a free interferogram is elaborated by only using the selected path differences.

Certain preferred, but non-limiting aspects of this method are the following:
 the thereby elaborated interferogram is completed with theoretical values, the theoretical values being arbitrary values or those originating from modelling, and in which a radiation spectrum is reconstructed from the thereby completed elaborated interferogram;
 interferometric inversion is applied by directly utilizing the information contained in the thereby elaborated interferogram without reconstructing a spectrum of the sampled radiation spectrum from the interferogram;
 in order to determine the contribution of a path difference to the optimization of said quantity, the influence of said variable on the interferogram is modelled;
 selection of the path differences is applied empirically from the modelling of the influence of the sought variable on said interferogram, so as to only select path differences which seem to mainly contribute to optimization of said quantity;
 said quantity is calculated for said interferogram and for an interferogram from which said path difference is removed and the difference between these calculations is produced in order to estimate the contribution of the path difference removed from the optimization of said quantity;
 the method comprises a subsequent step for selecting path differences applied in an algorithmic way from said modelling of the influence of the sought variable on the interferogram, so as to only select the most influential optical path differences for the inversion of said variable;
 the following steps are repeated iteratively:
  a: initially, no path difference is selected;
  b: the increase in the quantity characterizing the improvement in the inversion when said path difference is added to the whole of the path differences selected earlier, is calculated for each path difference;
  c: the path difference which maximizes the quantity characterizing the improvement in the inversion is added to the whole of the selected path differences, and step b is resumed until a compromise is reached between the number of selected path differences and the performance of the inversion.

According to a second aspect, the invention relates to an interferometer comprising means for receiving radiation having crossed a medium from an emission source, characterized in that it includes means for creating a finite number of optical path differences between two rays having followed the same path between the source and said input conformed for freely elaborating an interferogram from selected path differences without any sampling regularity constraints in accordance with the method according to the first aspect of the invention.

Other aspects, objects and advantages of the present invention will become better apparent upon reading the following detailed description of preferred embodiments thereof, given as a non-limiting example, and made with reference to the appended drawings wherein.

The invention for example finds application in the field of space. For example, the matter is to achieve remote detection, such as atmospheric sounding and inversion of the profiles of absorbing gases such as $CO$, $CO_2$, etc. (gases for which the regularity of the line comb is expressed by strong localization of the information in the interferogram, therefore a very advantageous optimum relatively to regular sampling of the interferogram, as required in standard spectrometry).

The invention also finds application out of the field of space. The matter for example is infrared spectroscopy applied to chemistry or to biology (for example in research as in the industry, for measuring the concentration of a target molecule in a gas or a liquid with an interferometer). Generally, any measurement made by spectroscopy, notably infrared spectroscopy, may be conducted by interferometric inversion with free/optimum sampling according to the present invention, the provided gain being, as this will be detailed further subsequently, all the greater since the useful information is concentrated in the interferogram.

It will be noted that with the invention, when it is applied to a static interferometer, good time resolution may also be obtained, necessary for characterizing transient phenomena.

Generally, and according to a first embodiment, the method according to the invention applies interferometric inversion by directly utilizing the information contained in the interferogram, without reconstructing a sampled radiation spectrum from the interferogram. The question is thus to directly utilize the information contained in the interferogram in order to gain knowledge on the characteristics of the source of the radiation and/or of the medium crossed by the radiation between the source and the interferometer, and this without any spectrum reconstruction. With this, it is possible to obtain characteristics such as the chemical composition, the concentration of a given molecular species, the temperature, the emissivity, etc., of the source and/or of the crossed medium, without carrying out the Fourier transform of the interferogram (i.e. without acquiring any spectrum) and therefore without any constraint on sampling the interferogram.

More specifically, within the scope of the invention, it is proposed to freely sample the interferogram only by using selected optical path differences without any sampling constraint, the contribution of which to inversion of a characteristic variable of the source and/or of the medium, is determined as being influential.

In other words, the invention proposes to freely sample the interferogram, by only selecting optical path differences containing the sought information, and by avoiding the introduction of parasitic signals which would be concentrated on other path differences. One operates in this way on an optimum sampling, which allows minimization of the number of measured samples, while maximizing the performances of the inversion of the targeted properties.

The method according to this embodiment of the invention thus proves to be advantageous notably in that with it:
  it is possible to have such a good final performance with less samples,
  or with as many samples it is possible to have a best final performance (accuracy of the measurement of one or more characteristics of the observed medium),
  or it is partly possible to win on both levels at a time by reducing the number of samples and by increasing the final performances of the inversion.

By reducing the number of samples, it is possible to have a simpler and more compact spectrometer in the case of a static echelette spectrometer, or with a better signal-to-noise ratio, for example by means of a larger integration surface. In the case of a Michelson spectrometer, the acquisition time of a free interferogram may be reduced (faster measurement) when the first sample is not with a path difference of zero.

By decreasing the number of samples it is also possible to decrease the number of data to be treated or to be transmitted (a limiting factor in the case of spatial measurement for example).

Finally, by selecting the path differences, it is possible to get rid of parasitic signals which would be mixed with the sought signal in the spectrum (for example low frequency spectral components).

In the following, an example of the advantage of free and optimum sampling of the interferogram is presented with view to an interferometric inversion for the characterization according to the invention of a radiation source and/or a medium crossed by the radiation.

In infrared spectroscopy, combs of absorption or emission lines characteristic of certain molecules are often observed. Now, the positions of these lines are dictated by energy transition rules in the molecule which involves quantum numbers. These lines therefore often have a very marked periodic pattern.

Figure 2:
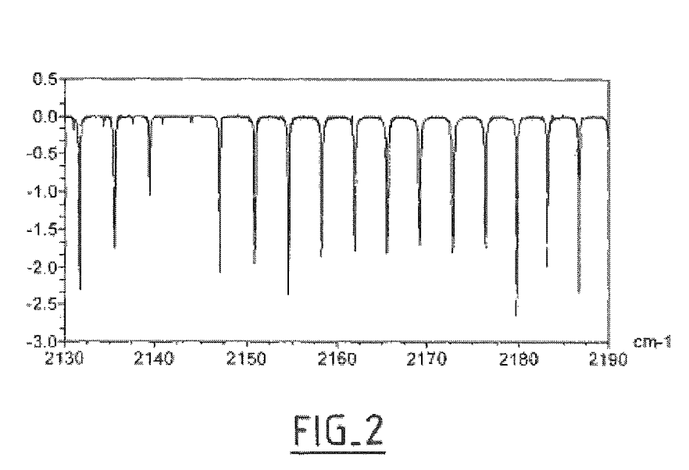
FIG. 2 illustrates a simulation of the observation of the spectrum of atmospheric luminance at the top of the atmosphere in which is observed a portion of the comb of carbon monoxide lines.

This is for example illustrated by FIG. 2 which illustrates a simulation of the observation of the spectrum of atmospheric luminance at the top of the atmosphere in which a portion of the comb of carbon monoxide (CO) lines is observed.

Figure 3:
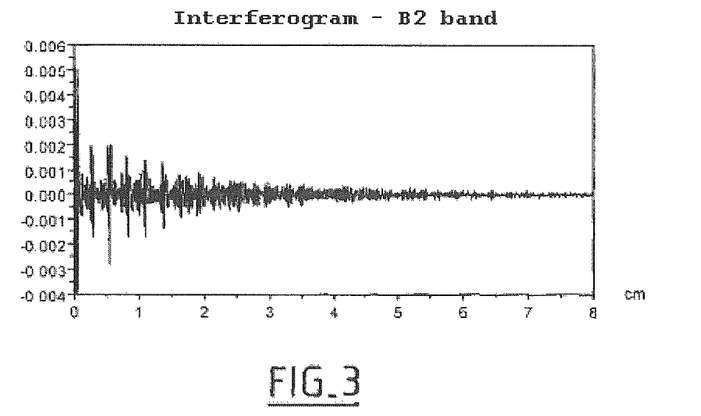
FIG. 3 illustrates the Fourier transform of the spectrum of FIG. 2 and corresponds to the signal of FIG. 2 in the domain of the interferogram.

As illustrated in FIG. 3 illustrating the Fourier transform of the spectrum of FIG. 2, this periodicity is also expressed in the field of the interferogram (Fourier transform of the spectrum) by a signal having periodic components.

Figure 4:
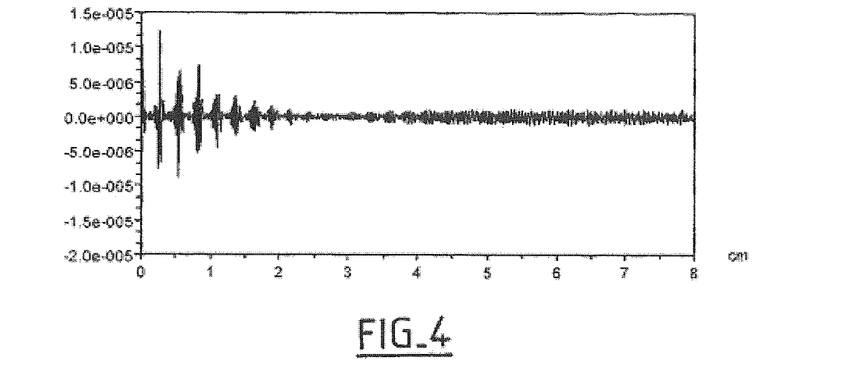
FIG. 4 illustrates the Jacobian of carbon monoxide in the interferogram of FIG. 3.

Thus in FIG. 3, regularly spaced-out marked oscillations around the base line (called <<bursts>> subsequently) are observed. These bursts are caused by the presence of the CO lines, as this is confirmed by the calculation of the Jacobians (partial derivatives of the interferogram relatively to the amount of CO) illustrated in FIG. 4.

Figure 5:
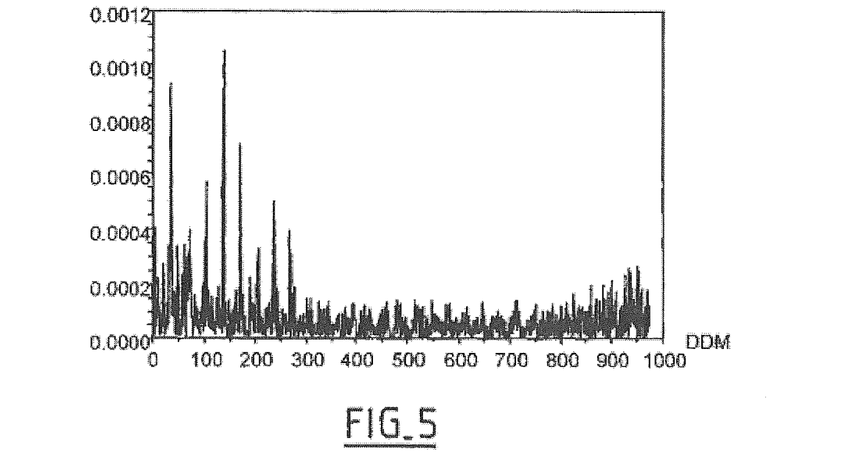
FIG. 5 illustrates the information content relatively to the carbon monoxide profile as a function of the path difference.

If it is sought to invert a vertical profile of the carbon monoxide (polluting gas) concentration in the atmosphere, it is desired to maximize the number of independent pieces of information along the vertical which it is possible to reach. In FIG. 5 it is seen that the contribution of the different samples of the interferogram (the <<path differences>> (DDMs)) to the inversion of the CO profile (characteristic variable of the crossed medium) is strongly variable.

Only acquiring the path differences in the interferogram which contain the useful information may therefore be contemplated.

It will be noted that such an approach is not applicable in the spectrum. Indeed, if certain samples of the spectrum certainly contain not much useful information (for example between two lines of the CO comb), spectroscopy by Fourier transform does not allow however acquisition of only a few samples of the spectrum since the latter is reconstructed as a block by an inverse Fourier transform of the interferogram.

In the example considered here, it is therefore understood that by optimizing the positions of the DDMs of the interferogram, it is possible to obtain an increase of information contents which could only have been obtained for regular sampling by improving the signal-to-noise ratio of the instrument (in the example, a factor slightly greater than 2). A contrario, if it is desired to keep the same performance, then for this example, it is calculated that 200 well-placed samples are just as efficient as almost 1,000 regularly placed samples.

According to an alternative embodiment of the invention, a spectrum is reconstructed while using optimized free sampling according to what has been shown earlier (and therefore capable of including large measurement <<holes>>) and it is proceeded with the inversion of this spectrum. For this purpose, the interferogram acquired by selecting path differences which contain the useful information, is completed by using theoretical values (modelled for certain a priori values of the variables, or even arbitrary values) in order to come down to sufficiently fine sampling (for example regularly sampled) in order to allow reconstruction of a spectrum by Fourier transform of the thereby completed sampled interferogram.

Within the scope of this alternative embodiment, the advantage of instrumental simplification or of improvement of the signal-to-noise ratio is retained but the advantage of the reduction in the number of data is then lost. However, obtaining a spectrum may be useful if a processing chain is available which takes spectra at the input and which is not intended to be modified for injecting interferograms therein.

The thereby obtained inversion on the spectrum may depend on a priori values used in the calculation of the non-acquired path differences, but this dependence may be reduced or even suppressed, for example if infinite noise is assigned to the simulated path differences in the process of inversion of the characteristic variables of the source and/or of the medium which are intended to be inverted.

Coming back to the general description of the invention, the optimization of the sampling of the interferogram consists of selecting, without any sampling regularity constraints, optical path differences, the contribution of which to the inversion of a sought variable in order to characterize the source and/or the medium is determined as being influential.

This selection may be made empirically, for example from the viewing of the positions of the bursts in a simulated interferogram for example.

This selection may also be made in an algorithmic way according to the principle discussed hereafter:
  a: a quantity G which characterizes the improvement in the inversion is determined. By improvement in the inversion, is in particular meant an optimization in the measurement of the characteristic variable of (qualitative or quantitative) properties of the source and/or of the crossed medium. Initially, no DDM is selected and G=0;
  b: for each DDM i the increase in the quantity G is calculated when the DDM i is added to the whole of the DDMs selected previously;

c: the DDM i which maximizes the quantity G is added to the whole of the selected DDMs and step b is resumed.

The algorithm finishes when the compromise between the number of selected DDMs and the performance of the attained inversion is considered as being optimum. Thus, path differences which mainly contribute to the optimization of the quantity G are selected, while removing those which only have very little influence on the optimization of this quantity. With this algorithm it is possible to select the DDMs sensitive to the sought signal (CO in the example shown earlier) but to also remove the DDMs sensitive to parasitic atmospheric signals (for example water vapour, or the surface temperature).

Different possible embodiments according to the first aspect of the invention are detailed hereafter.

Step A: Obtaining the Distribution of the Information Contents in an Interferogram The interferogram is a <<quasi-continuous>> interferogram sampled as finely as possible in order to scan <<all>> the possible positions, or at the very least all the positions for which acquisition is contemplated (it is possible to voluntarily ignore certain areas if it is known a priori that they are uninteresting or that it is impossible to acquire them, for example too high DDMs for the maximum size of the instrument). This <<quasi-continuous>> interferogram may be theoretical (originating from modelling) or real (if another instrument is available for acquiring such an interferogram).

Once the application (or applications) is (are) selected (for example, the measurement of the atmospheric profile of CO, ozone, of temperature, or the recognition of a molecule or a family of molecules . . . ), a quantity is determined, capable of characterizing the performance or the improvement of the inversion. As non-limiting examples of such a quantity, mention may be made of:
  the number of independent elements along the vertical in the case of atmospheric sounding, for example in order to obtain the concentration profile of a gas such as CO (given by the number of DOFS (Degrees Of Freedom for Signal), as described for example in the textbook of Rodgers, C. D., 2000: <<Inverse methods for atmospheric sounding: theory and practice>>, World Scientific). Maximization of this quantity will then be sought;
  the accuracy of the inverted variable, for example the percentage accuracy on the CO concentration in the layer of air comprised between 0 and 2 km (if the concern is CO near the surface). Minimization of this quantity will be sought;
  a component of the error on the inverted product. The matter for example is to minimize the error related to a parameter of the model (for example the air temperature) on the product (for example the integrated CO concentration over the whole air column);
  the capability of discriminating two different molecules.

Next, in a second phase, the information which each DDM would provide to the optimization of the <<inversion performance>> quantity determined in the previous step (maximization or minimization depending on the case), is determined.
For this:
  the influence of the sought variable on the <<quasi continuous>> interferogram will be modelled. In the case of atmospheric sounding, this is accomplished by a radiative transfer code, which provides an infinitely resolved spectrum and from which an interferogram may be calculated by applying a Fourier transform.

Depending on the case, it is possible to model:
the interferogram
the Jacobians of the interferogram (partial derivatives of the signal of the interferogram relatively to the quantity (ies) to be inverted). The Jacobians give the sensitivity of each DDM to the quantity to be inverted. It is also possible to calculate the Jacobians of the interferogram relatively to its <<parasitic>> components (for example the air humidity in the case of CO; other example, an instrumental defect such as the gain).

Step B: Selection of the DDMs
Several alternatives are possible.
As already indicated, this selection may be made empirically.
  Under the assumption that one starts with the interferogram (FIG. 3), the DDMs which correspond to bursts, are selected if it is certain that their presence is actually caused by the targeted species.
  Under the assumption that one starts with the Jacobians (FIG. 4), which directly provide the sensitivity of each DDM to the target species, the DDMs are selected in the bursts (it is then certain that they are actually the signature of the sought species and not of another parameter).
  Under the assumption that one starts with a more elaborate information content indicator (FIG. 5), the DDMs are selected there where the contents are more significant.

The <<performance of the inversion>> quantity is calculated for example (by explicit inversion, or according to estimation techniques) for the complete <<quasi-continuous>> interferogram and for the interferogram from which a DDM is removed.

By difference between both of these calculations, an estimation of the contribution of the removed DDM to the <<performance of the inversion>> quantity is obtained. FIG. 5 illustrates such an estimation made by calculating the DOFS from the equations given in the textbook of Rodgers already mentioned above, from Jacobians in the interferogram for CO and for variable parameters (humidity, temperature . . . ).

This embodiment has the advantage of that the thereby determined <<information content>> not only takes into account the sensitivity to CO (which is maximized since it should be as great as possible) but also the sensitivity to the other parameters (humidity, temperature, etc.) which is minimized (which amounts to performing a sort of filtering of the parasitic signals).

As also already indicated earlier, the selection of the DDMs may also be made in an algorithmic way.
  The iterative method, an example of which is given above in this document, may be applied. In the present case, G is the number of DOFS, calculated from Jacobians in the interferogram of CO and of the other variables.
  Another possible technique consists of achieving grouping of close DDMs by <<clusters>>, either by studying correlations between DDMs, or further by searching similarity between vertical Jacobians (for example in the case of the inversion of a profile). A single representative of each cluster may then be selected, which limits the number of DDMs to be acquired.
  In the case of grouping based on correlation, optimization is not only performed relatively to the variable to be inverted but also relatively to the whole of the variable parameters by which the <<base>> may be obtained, on which the correlation is calculated.
  Still another possible technique consists of using analyses of the <<MCA>> (Main Component Analysis) type in order to identify the component(s) bearing the signal of interest (a class for which the variance is maximum relatively to the quantity to be inverted, and minimum relatively to the other variables) and to then select the DDMs which are mainly involved in these components.

Still another technique consists of proceeding from the application of the inversion model with several differently sampled simulated interferograms. Among the tested samplings, the sampling which gives the most satisfactory inversions is then retained, by using as a comparison element the quantity <<performance of the inversion>> selected earlier.

The invention of course is not limited to a method for characterizing of a source and/or a medium, but also extends to an interferometer intended to be used in such a method, the interferometer comprising means for receiving radiation having crossed a medium from an emission source, and being characterized in that it includes means for creating a finite number of optical path differences between two rays having followed the same path between the source and said input conformed in order to elaborate an interferogram from path differences, the contribution of which during the inversion of a characteristic variable of the source and/or of the medium is determined as being influential.

The following more specifically relates to the practical implementation of the method according to the first aspect of the invention, and endeavours to describe different possible embodiments of an interferometer according to the second aspect of the invention.

Dynamic Interferometer

In the case of a dynamic interferometer, a single detector acquires the information. The different <<path differences>> are produced by displacing one of the two arms of the interferometer. The single detector then acquires the interferometric signal as a function of time.

In the conventional configuration, when the motor displaces the mirror, a continuous transition occurs over all the path differences. The whole of the path differences are thus acquired continuously.

Now, no instrumental gain is therefore observed by selecting some of the most interesting of them. On the other hand, a gain is observed in only transmitting the required data, which for example in the case of on-board instrumentation, allows a reduction in the remote measurement throughput.

An instrumental alternative of the dynamic FT spectrometer consists of replacing the DC motor with a stepping motor. This is required in the case of low flux applications (in order to be able to have a long integration time of the signal), or in the case of applications requiring modulation in the presence of measurements, for which noise is dominated by parasitic sources. Such an instrumental alternative with a stepping motor may therefore be used for only acquiring the useful DDMs. With this, it is then possible to increase the measurement time, therefore the signal/noise ratio, or to reduce the measurement time for a given signal/noise ratio;

According to an alternative of the second aspect of the invention, provision is thus made for a dynamic interferometer provided with a stepping motor and means for controlling the motor, adapted for displacing the mirror to the path differences selected for their contribution.

Static Echelette Interferometer

It was shown in document FR 2 787 186 that the dynamic spectrometer may be simplified by replacing the device for displacing the mirror by a system of echelettes. The path difference is not in this case created by displacing one of the two mirrors, but by fragmenting at least one of the mirrors into a series of small mirrors (such as small steps).

Each small area of the thereby fragmented mirror, i.e. each step, is positioned at a certain path difference. The whole of the path differences is then acquired simultaneously by a detector array imaging the fragmented mirrors (i.e. the steps). In other words, N Michelson interferometers are produced in parallel, each being <<frozen>> at a selected path difference and simultaneously imaged on a detector array.

The instrumental limitation of this principle is related to the technological capacity of making these fragmented mirrors. High spectral resolution is however possible if one is limited to a narrow spectrum since the <<fragmentation number>> of the mirror is directly proportional to the number of samples which are intended in the spectrum (i.e. the ratio of the spectral width over the spectral resolution).

It is therefore understood that the present invention fully benefits from such a static interferometer with echelettes insofar that, while maintaining the same sensitivity, it allows limitation of the number of steps to be made.

Likewise, a same number of steps may be kept, and a greater spectral band may thereby be sounded, and therefore more spectral information may be used.

Finally the spectral resolution may be increased, always with the same number of steps, which also increases the spectral information.

According to a second aspect of the invention, provision is thus made for a static interferometer with echelettes, at least one of the mirrors of which has a plurality of reflective surfaces laid out so as to provide the selected path differences for their contribution.

As an exemplary embodiment, two mirrors with echelettes each comprising 30 steps are used for generating for example 900 different DDMs. Both mirrors are at 90° from each other and form a network of 900 different DDMs. For this, the first mirror consists of small regular steps. The second mirror consists of large steps, the height of the large step being the sum of the heights of the small steps of the mirror with <<small echelettes>>. Regular progression of the sampling is thereby obtained without any information redundancy.

With the small steps, it is possible to obtain finer meshing between two large steps. It is therefore difficult to modify the pitch of the first staircase in order to adapt it to each area of the interferogram. On the other hand, the large steps may be completely irregular so as to define an area of interest around which the small steps will make finer meshing.

When the number of steps is sufficiently small (typically less than 100), it is possible to contemplate not two 90° glass staircases, but a planar mirror plus a stepped mirror (or any other combination of the two solutions). The sampling is then completely free.

Quasi-Static Interferometer

The sampling DDM pitch of the static interferometer with echelettes results in the capability of controlling the assembling of glass staircases (or of the glass set depending on its shape). This capability may be of the order of 1-2 µm, which poses an additional difficulty in the field of short wavelengths. Indeed, the optimum position determined by the previous algorithms has to be obtained at a fraction of a wavelength. In the visible-near infrared domain, practically achieving this may then prove to be difficult to obtain.

According to still another alternative embodiment, an adapted modulator is added to the static interferometer with echelettes so as to slightly vary the DDM by typically of the order of a fraction of a wavelength, or even by a few wavelengths, simultaneously for all the echelettes.

For example, the tilt of the glass compensator of the Michelson may be varied, or further one of the mirrors with echelettes may also be mounted on a piezoelectric mechanism. The required displacement is for example a quarter wavelength (i.e. 2.5 µm for a spectral band around 10 µm), which may be achieved with a simple mechanism (of the piezoelectric type), unlike the travel of several centimeters required in the case of the dynamic FT spectrometer. The thereby achieved instrument is described as a <<quasi-static interferometer>>.

With a displacement of a fraction of a wavelength between two acquisitions, when the error of achieving this is such that a neutral interference state is found (thereby without any information), the next acquisition, displaced by one or a few fractions of a wavelength, is found in a different and non-neutral state of interference. One thus gets rid of the difficulty of producing the steps and sampling is finer around the determined areas of interest.

Dynamic Echelette Interferometer

According to another possible alternative embodiment, provision is made for combining the solutions discussed above, by adding echelettes to a dynamic interferometer which notably allows an increase in the spectral resolution thereof.

For example, for a conventional spectrometer with a travel of 2 cm, the mirror may be fragmented into 4 steps, according to a progression of the step heights of 2 cm. 4 interferograms may thereby be obtained, the first from 0-2 cm, the second from 2-4 cm, etc., and a resolution of 8 cm may be attained. It is also possible to have 4 non-joined interferograms, by shifting the steps by a value greater than the travel, in the case when the lacking information is of low significance.

The invention claimed is:

1. A method of measuring a characteristic variable of a radiation source and/or of a medium by applying interferometric inversion, the medium being crossed by radiation between the radiation source and an interferometer, the interferometer being capable of elaborating an interferogram of the radiation by creating a finite number of optical path differences between two rays having followed a same path between the radiation source and the interferometer, the method comprising:
   for each of the optical path differences that the interferometer is capable of using to elaborate an interferogram of the radiation, estimating a contribution of the path difference to the interferometric inversion of the characteristic variable;
   selecting some of the optical path differences based on the results derived from estimating a contribution of each path difference, wherein said selecting is operated without any constraints of sampling regularity, and further comprises using a quantity characterizing the characteristic variable, and iteratively performing the following steps:
      for each of the optical path differences, calculating an increase in the quantity when said path difference is added to the previously selected path differences; and
      for the path difference which causes the greatest increase in the quantity, adding said path difference to the previously selected path differences
   until a maximum number of selected path differences is reached or the quantity exceeds a preselected threshold;
   elaborating, with the interferometer, an interferogram of the radiation using only the selected optical path differences; and
   measuring the characteristic variable of the radiation source and/or medium based on information contained in the interferogram elaborated using only the selected optical path differences, without any reconstruction of a radiation spectrum from the interferogram.

2. The method according to claim 1, wherein estimating a contribution of the path difference to the interferometric inversion of the characteristic variable comprises modelling said contribution on the interferogram.

3. The method according to claim 2, wherein selecting some of the path differences comprises applying empirically the modelled contributions to the interferometric inversion of the characteristic variable on said interferogram.

4. The method according to claim 1, wherein estimating a contribution of the path difference to the interferometric inversion of the characteristic variable comprises:
   calculating a first quantity characterizing said characteristic variable for the interferogram elaborated with the interferometer;
   calculating a second quantity characterizing said characteristic variable for a second interferogram elaborated with the interferometer from which one of the path differences is removed; and
   obtaining a difference between the first quantity and the second quantity.

5. A method of measuring a characteristic variable of a radiation source and/or of a medium by applying interferometric inversion, the medium being crossed by radiation between the radiation source and an interferometer, the interferometer being capable of elaborating an interferogram of the radiation by creating a finite number of optical path differences between two rays having followed a same path between the radiation source and the interferometer, the method comprising:
   for each of the optical path differences that the interferometer is capable of using to elaborate an interferogram of the radiation, estimating a contribution of the path difference to the interferometric inversion of the characteristic variable;
   selecting some of the optical path differences based on the results derived from estimating a contribution of each path difference, wherein said selecting is operated without any constraints of sampling regularity, and further comprises using a quantity characterizing the characteristic variable, and iteratively performing the following steps:
      for each of the optical path differences, calculating an increase in the quantity when said path difference is added to the previously selected path differences; and
      for the path difference which causes the greatest increase in the quantity, adding said path difference to the previously selected path differences
   until a maximum number of selected path differences is reached or the quantity exceeds a preselected threshold;
   elaborating, with the interferometer, an interferogram of the radiation using only the selected optical path differences;
   completing the interferogram elaborated with the interferometer using only the selected optical path differences with theoretical values, the theoretical values being arbitrary values or values obtained from modelling;
   reconstructing a radiation spectrum from the completed elaborated interferogram; and
   measuring the characteristic variable of the radiation source and/or medium using the reconstructed radiation spectrum.

6. The method according to claim 5, wherein estimating a contribution of the path difference to the interferometric inversion of the characteristic variable comprises:
   calculating a first quantity characterizing said characteristic variable for the interferogram elaborated with the interferometer;

calculating a second quantity characterizing said characteristic variable for a second interferogram elaborated with the interferometer from which one of the path differences is removed; and obtaining a difference between the first quantity and the second quantity.

* * * * *